(12) United States Patent
Ryne et al.

(10) Patent No.: US 11,697,449 B2
(45) Date of Patent: Jul. 11, 2023

(54) SYSTEM, METHOD AND APPARATUS FOR ALTERNATE LOCATIONS FOR A RAKE PIVOT AXIS FOR A STEER-BY-WIRE STEERING COLUMN

(71) Applicant: Steering Solutions IP Holding Corporation, Saginaw, MI (US)

(72) Inventors: Patrik M. Ryne, Lake Orion, MI (US); George E. Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 350 days.

(21) Appl. No.: 17/033,173

(22) Filed: Sep. 25, 2020

(65) Prior Publication Data

US 2021/0129894 A1 May 6, 2021

Related U.S. Application Data

(60) Provisional application No. 62/931,484, filed on Nov. 6, 2019.

(51) Int. Cl.
*B62D 1/187* (2006.01)
*B60R 21/203* (2006.01)
(Continued)

(52) U.S. Cl.
CPC .............. *B62D 1/187* (2013.01); *B60K 20/06* (2013.01); *B60K 35/00* (2013.01); *B60K 2370/77* (2019.05); *B60R 21/203* (2013.01)

(58) Field of Classification Search
CPC .......... B62D 1/187; B62D 1/189; B62D 1/18; B60K 2370/77; B60K 20/06; B60R 21/203
See application file for complete search history.

(56) References Cited

U.S. PATENT DOCUMENTS

| 4,494,773 A | * | 1/1985 | Fukui | ..................... | B62D 1/187 |
| | | | | | 280/775 |
| 5,131,287 A | * | 7/1992 | Stromberg | ............. | B62D 1/184 |
| | | | | | 280/775 |

(Continued)

FOREIGN PATENT DOCUMENTS

| CN | 106660572 A | 5/2017 |
| CN | 108137078 A | 6/2018 |

(Continued)

OTHER PUBLICATIONS

EPO Translation of the Description of DE 102011110006 A1, Welker et al., Feb. 23, 2012. (Year: 2022).*

(Continued)

*Primary Examiner* — Daniel D Yabut
(74) *Attorney, Agent, or Firm* — Dickinson Wright PLLC (57) ABSTRACT

A steering column assembly including a steering column for a steer-by-wire application. The steering column extends between a first end and a second end and includes a hand wheel location on the first end and a rotation output on the second end. The steering column assembly further includes a rake bracket assembly that is spaced from the rotation output and towards the hand wheel location. The rake bracket assembly defines a pivot axis from which the steering column can tilt. During rake movement or tilting, the first end and the second end of the steering column both pivot as the steering column is adjusted about the pivot axis.

15 Claims, 6 Drawing Sheets

(51) Int. Cl.
*B60K 20/06* (2006.01)
*B60K 35/00* (2006.01)

(56) References Cited

U.S. PATENT DOCUMENTS

| | | | | |
|---|---|---|---|---|
| 5,606,891 | A | * 3/1997 | Tisell | B62D 1/184 280/775 |
| 6,357,318 | B1 | * 3/2002 | Koellisch | B62D 1/184 280/775 |
| 2003/0209381 | A1 | * 11/2003 | Menjak | B60R 21/205 180/402 |
| 2012/0043746 | A1 | 2/2012 | Welker et al. | |
| 2013/0233117 | A1 | * 9/2013 | Read | B62D 1/192 74/493 |
| 2014/0047941 | A1 | * 2/2014 | Park | B62D 1/187 74/493 |
| 2014/0305252 | A1 | 10/2014 | Mizuno | |
| 2015/0048608 | A1 | * 2/2015 | Morinaga | B62D 1/181 280/775 |
| 2018/0319420 | A1 | * 11/2018 | Huber | B62D 1/181 |

FOREIGN PATENT DOCUMENTS

| | | |
|---|---|---|
| DE | 19860793 A1 | 7/2000 |
| DE | 102011110006 A1 | 2/2012 |
| DE | 102011120294 A1 | 6/2013 |

OTHER PUBLICATIONS

German Examination Report with translation corresponding to German Application No. 10 2020 129 215.5 dated Apr. 12, 2021.
First Office Action regarding corresponding CN App. No. 202011229499.5; dated Sep. 5, 2022.

* cited by examiner

SYSTEM, METHOD AND APPARATUS FOR ALTERNATE LOCATIONS FOR A RAKE PIVOT AXIS FOR A STEER-BY-WIRE STEERING COLUMN

CROSS-REFERENCE TO RELATED APPLICATION

This U.S. Utility Patent Application claims the benefit of and priority to U.S. Provisional Patent Application Ser. No. 62/931,484, filed on Nov. 6, 2019, and titled "System, Method and Apparatus for Alternative Locations for a Rake Pivot Axis for a Steer-By-Wire Steering Column," the entire disclosure of which is hereby incorporated by reference.

FIELD OF THE INVENTION

The embodiments described herein relate to vehicle steering systems and, more particularly, to a steering column with a rake pivot axis.

BACKGROUND

Conventional steering columns can be manually operated or electronically adjusted via actuators. Depending on the user requirements, such columns can be adjusted in various directions, including the telescope (i.e., along the axis of the column) and/or rake (i.e., tilt) directions. Steering columns can telescope in several ways. For example, some steering columns telescope via telescoping jackets or shafts. Other examples of steering columns can be axially adjusted via a fixed shaft and a translating or slidable jacket assembly.

Steering columns with a rake adjustment capability adjust the rake angle of the steering column with respect to a pivot axis. For example, for a steering column 10 with an I-shaft 12 and a lower cardan joint 14, the pivot axis 16 is typically close to the I-shaft's lower cardan joint 14 (see FIG. 1 for traditional pivot points or axes). If the pivot axis 16 is located too far away from the lower cardan joint 14 of the I-shaft 12, then the driver will experience high torque variation in the steering torque. In most cases this is not acceptable to users.

Conventional steering columns can also increase the amount of space required by the steering column assembly to operate in the underlying structure. As some end use applications are actually decreasing the space available for steering column assembles, the existing steering column solutions are becoming an issue. Thus, improvements in the adjustability of steering columns continue to be of interest.

SUMMARY

According to one aspect of the disclosure, a steering column assembly is provided. The steering column assembly includes a steering column that is configured for a steer-by-wire application. The steering column extends between a first end and a second end and has a hand wheel location on the first end and a rotation output on the second end. The steering column assembly further includes a rake bracket assembly that is spaced apart from the rotation output and towards the hand wheel location. The rake bracket assembly defines a pivot axis from which the steering column can tilt, wherein the first end and the second end of the steering column both pivot as the steering column is adjusted about the pivot axis.

According another aspect of the disclosure, a steering column assembly is provided. The steering column assembly includes a steering column that extends along a longitudinal axis between a first end and a second end and has a hand wheel location on the first end and a cardan joint on the second end. The steering column includes an upper jacket and a lower jacket, wherein the upper jacket and lower jacket are telescopically connected and moveable along the longitudinal axis. The steering column assembly further includes a rake bracket assembly spaced apart from the rotation output and towards the hand wheel location. The rake bracket assembly defines a pivot axis from which the steering column can tilt, wherein the first end and the second end of the steering column both pivot as the steering column is adjusted about the pivot axis.

According to yet another aspect of the disclosure, a steering column assembly is provided. The steering column assembly includes a steering column that is configured for a steer-by-wire application. The steering column extends between a first end and a second end and has a hand wheel location on the first end and a rotation output on the second end. The steering column assembly further includes a rake bracket assembly spaced apart from the rotation output and towards the hand wheel location. The rake bracket assembly defines a pivot axis from which the steering column can tilt, wherein the first end and the second end of the steering column both pivot as the steering column is adjusted about the pivot axis. The steering column assembly further including a rake adjustment actuator including a motor for tilting and retaining the steering column about the pivot axis.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the drawings, where the various embodiments are shown and described herein, without limiting same, FIGS. 2-6 illustrate embodiments of a system, method and apparatus for alternate locations for rake pivot axes for steering columns including those configured for steer-by-wire applications.

Figure 2:
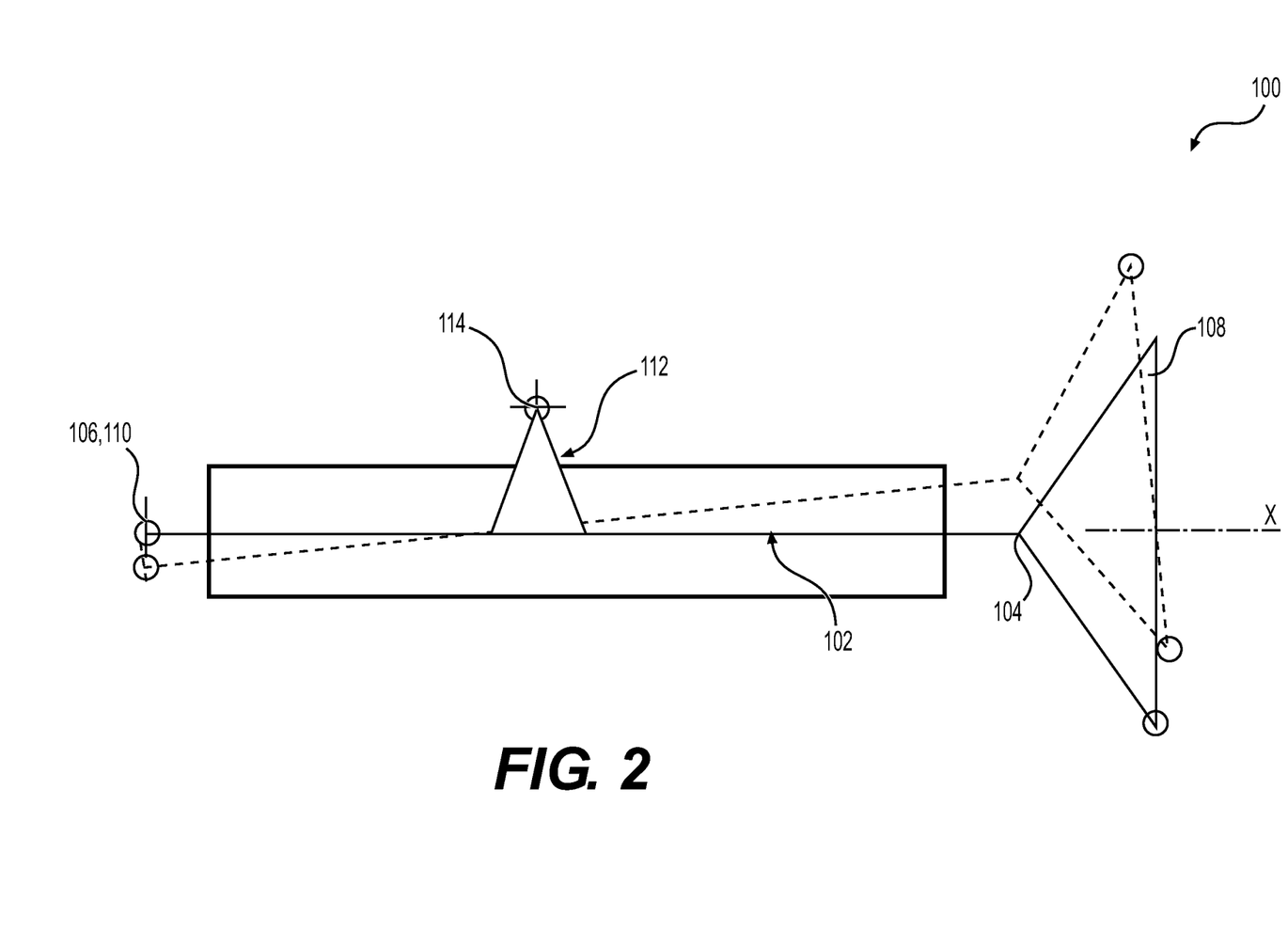
FIG. 2 is a schematic drawing depicting an embodiment of a steering column assembly that includes a rake bracket assembly.

With reference initially to FIG. 2, a steering column assembly 100 in accordance with the present invention is schematically illustrated. The steering column assembly 100 includes a steering column 102 extending along a longitudinal axis X between a first end 104 and a second end 106. A rotational input 108, such as a steering wheel, is located on the first end 104 (hand wheel location) and a rotation output 110 is located on the second end 106. The rotation output 110 may include a pinion shaft assembly, an I-shaft, a cardan joint, steer-by-wire components or any other features conventionally located opposite the steering wheel 108. The steering column assembly 100 includes a rake bracket assembly 112 located centrally between the first end 104 and the second end 106. The rake bracket assembly 112 includes a pivot axis 114 and facilitates rake movement of the steering column 102 about the pivot axis 114, which is disposed transverse to the longitudinal axis X. As such, when the steering column 102 is tilted with respect to the pivot axis 114, vertical movement of the first end 104 may be equal or substantially equal (within 20%) but opposite to the movement of the second end 106. However, as will be appreciated with further reading, the location of the pivot axis 114 can vary dramatically based on rake and packaging requirements.

Figure 1:
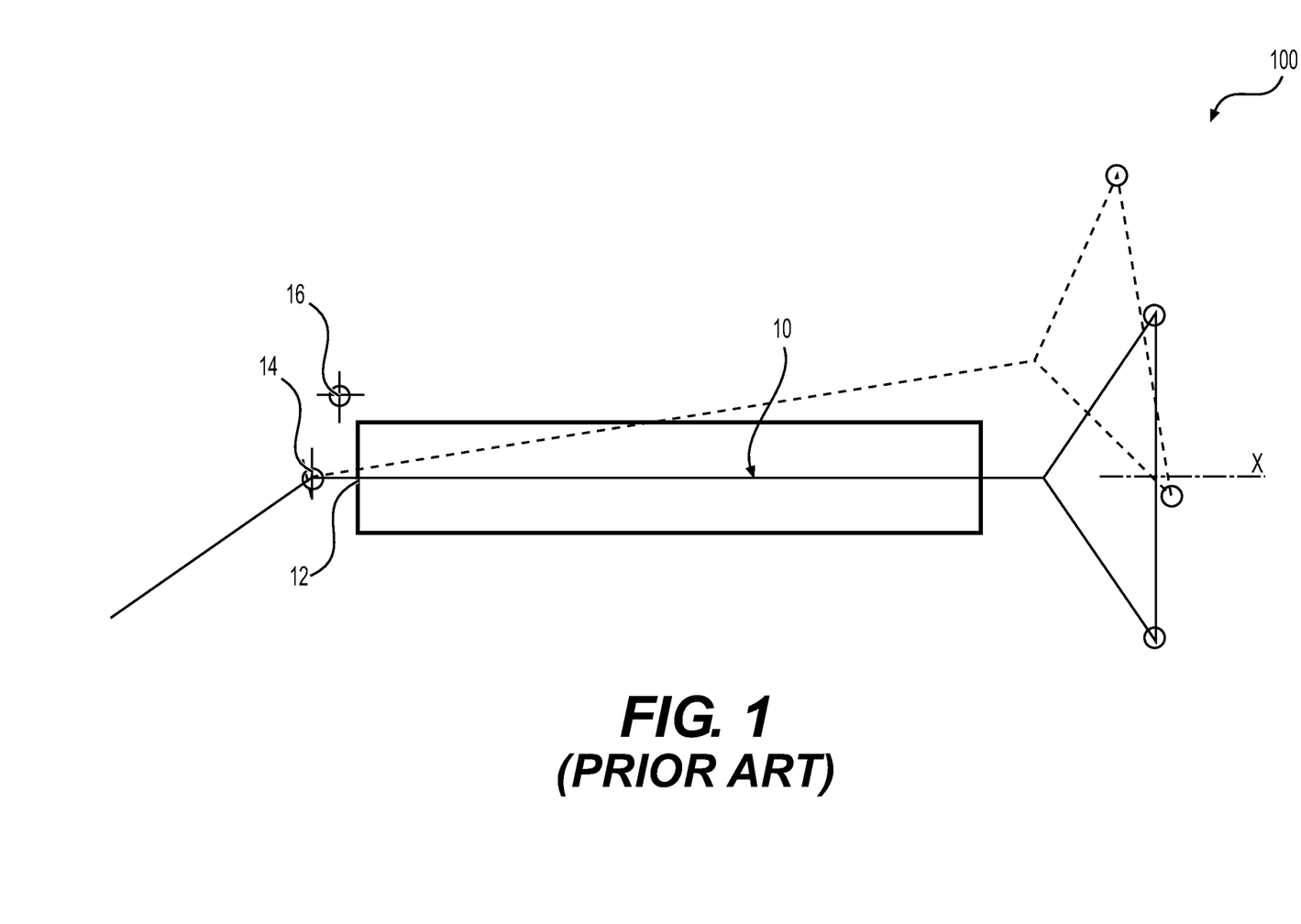
FIG. 1 is a schematic drawing depicting conventional configurations for rake pivot axes for conventional, mechanical steering columns.
Figure 3:
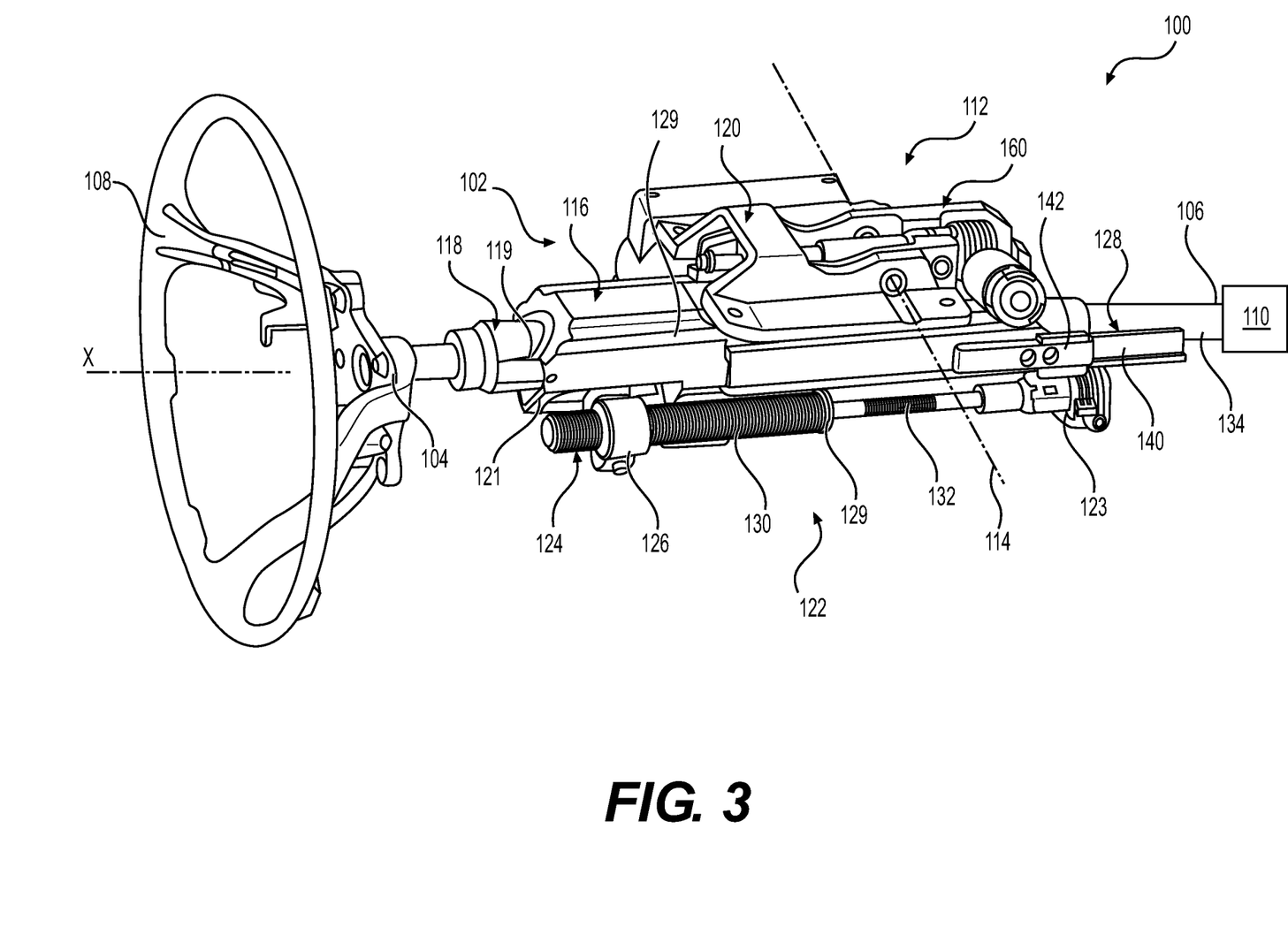
FIG. 3 is an isometric view of the steering column assembly.
Figure 4:
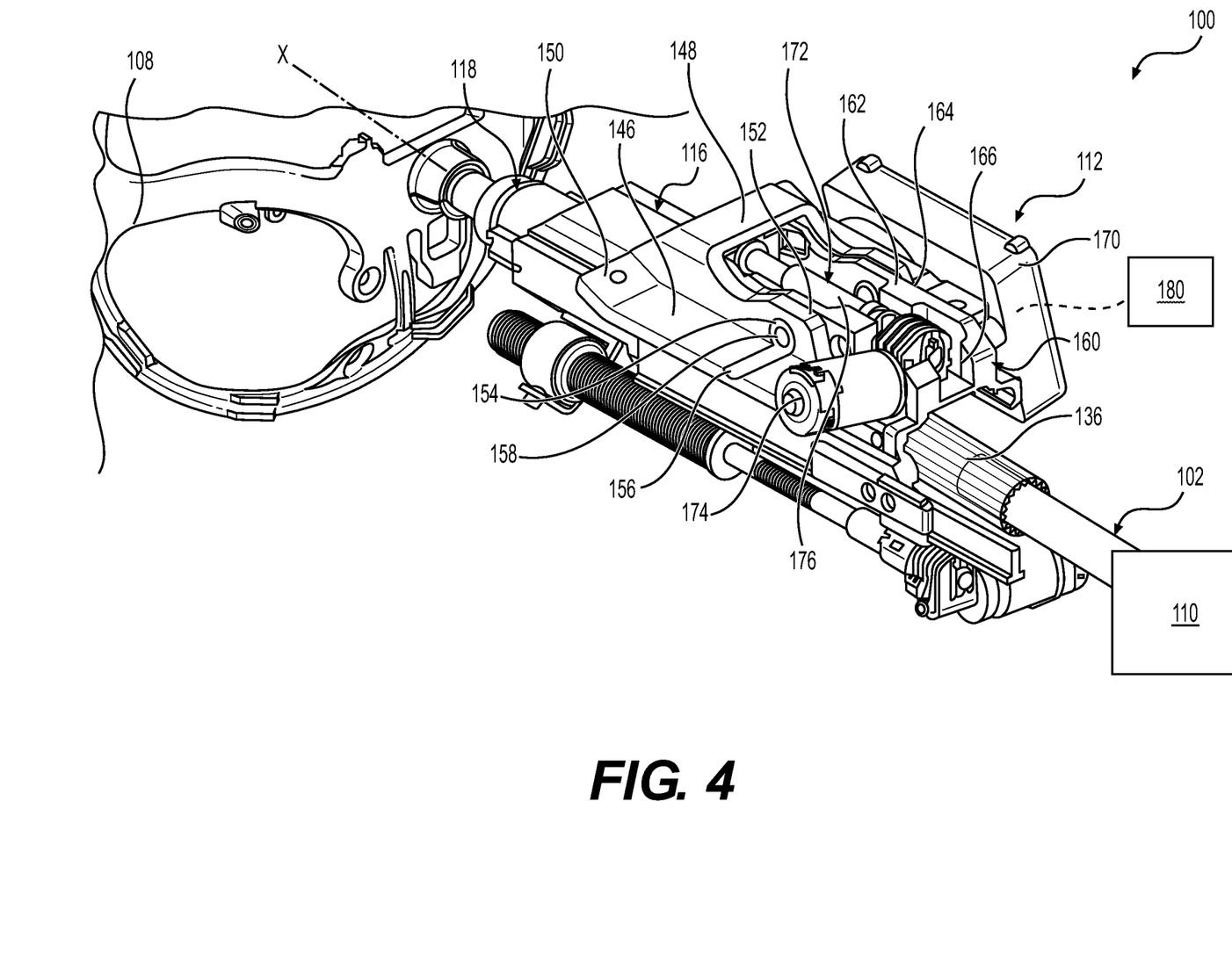
FIG. 4. is an alternate isometric view of the steering column assembly.
Figure 5:
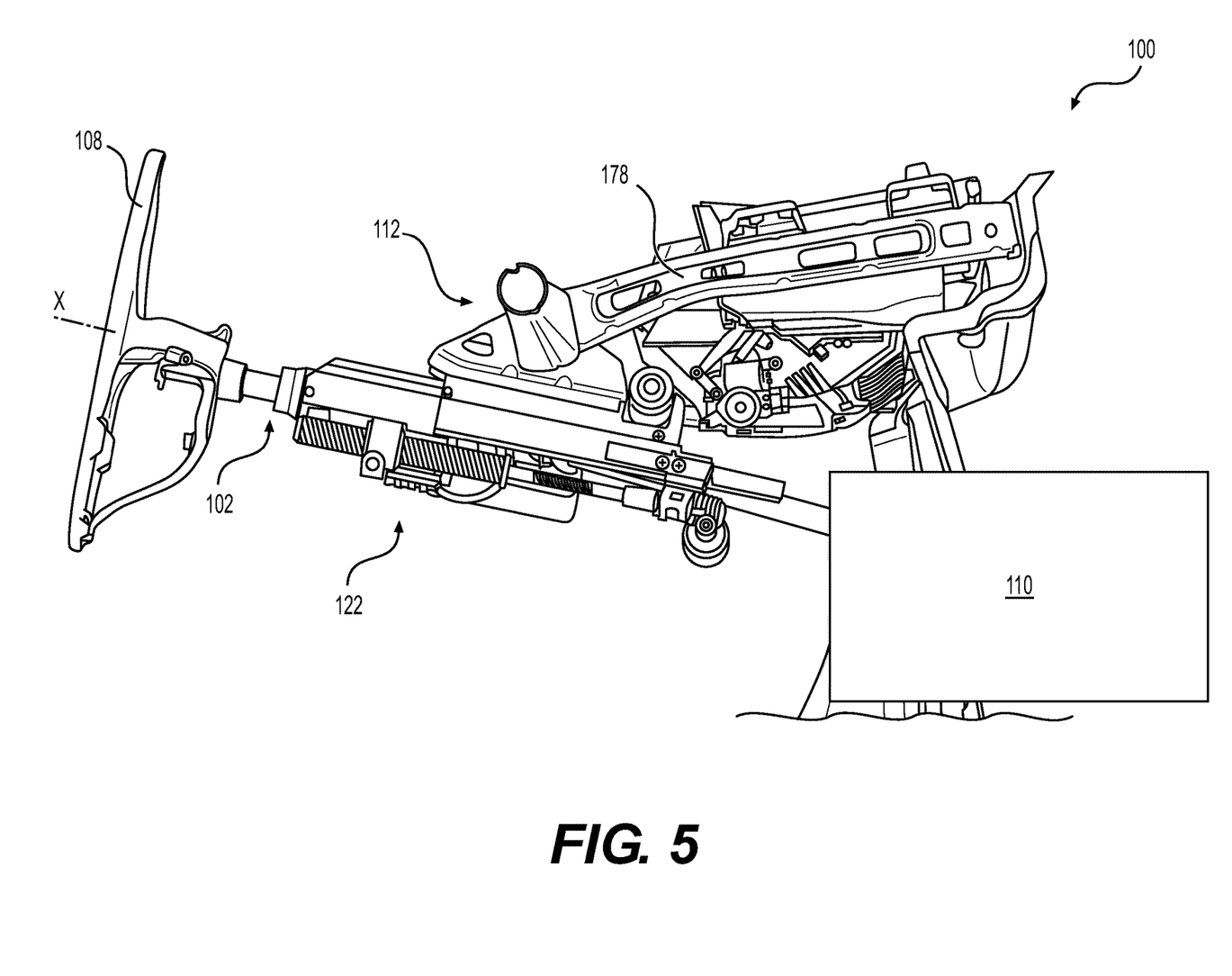
FIG. 5 is another isometric view of the steering column assembly wherein it has been tilted via movement of the rake bracket assembly.

With reference now to FIG. 3, an isometric view of the steering column assembly 100 is provided. The steering column 102 may be both rake and telescopically adjustable and include a lower jacket 116 and an upper jacket 118. The rake bracket assembly 112 includes a mounting bracket 120 that is operatively coupled to the steering column 102. The lower jacket 116 and the upper jacket 118 may be disposed about the longitudinal axis X. The upper jacket 118 may be the outer jacket defining an inner bore (not shown) and/or, alternatively, may be the inner jacket (FIG. 1). The upper jacket 118 may further include a track 119 (FIG. 1) that receives at least a portion of the lower jacket 116. The lower jacket 116 likewise may be the outer jacket and define an inner bore (FIG. 1) and/or alternatively may be the inner jacket (not shown). The lower jacket 116 may further include a slider (not shown) that mates with the track 119 of the upper jacket 118 to facilitate axial travel and reduce lash. As illustrated in FIGS. 3-5, the upper jacket 118 is an inner jacket and the lower jacket 116 is an outer jacket that is received within a bore in the upper jacket 118. The track 119 in the upper jacket 118 defines a groove along which the slider, which may include ball bearings, can travel during telescopic movement.

Telescopic movement of one jacket 116, 118 relative to the other jacket 116, 118 is along the longitudinal axis X and may be by operation of a longitudinal actuator 122. The longitudinal actuator 122 may include a motor 123 and a gear mechanism 124 (such as a lead screw assembly or worm gear assembly) that connects to one jacket 116, 118 on a first end and the other jacket 116, 118 on a second end. More particularly, the gear mechanism 124 may include a spindle nut 126 connected to the upper jacket 118 through a window 121 in the lower jacket 116. A sliding bracket 128 is connected to the mounting bracket 120 and slidably connected the lower jacket 116 via a track and rail or keyway connection 129, relative movement of which is facilitated by the longitudinal actuator 122. The longitudinal actuator 122 further includes a spindle 129 (e.g., lead screw) extending between the spindle nut 126 and the sliding bracket 128. The motor 123 may rotate the spindle nut 126 causing expansion and retraction of the spindle 129, or alternatively, it may directly rotate the spindle 129. The spindle 129 may include an outer spindle shaft 130 (e.g., outer lead screw) defining a bore and an inner spindle shaft 132 (e.g., inner lead screw) received within the bore, wherein the inner spindle shaft 132 is located in the bore when the longitudinal actuator 122 telescopically compresses the upper and lower jackets 116, 118. When the longitudinal actuator 122 telescopically expands the upper and lower jackets 116, 118, the inner spindle shaft 132 at least partially exits the bore. The bore and inner spindle shaft 132 may both include meshed teeth to facilitate telescopic movement. The steering column 102, such as the lower jacket 116 may include a shaft 134 near the second end 106. For example, the shaft 134 may include a splined inner bore 136 (FIG. 4) that connects to the rotation output 110 and allows a certain amount of play along the longitudinal axis X. The rotation output 110, may include a cardan joint, yoke, or components associated with steer-by-wire applications. The sliding bracket 128 may include an adjustable rail 140 and clip 142 that allows the connection location of the sliding bracket 128 to be modified with respect to the lower jacket 116 and/or the longitudinal actuator 122. As such, the maximum extension of the steering column along the longitudinal axis X may be adjusted for various implementations and vehicular packaging requirements.

The steering column 102 is operatively connected to a vehicle structure via the mounting bracket 120, the mounting bracket 120 may connect to an intervening component or directly to the vehicle structure. In embodiments wherein the steering column 102 includes the lower jacket 116 and the upper jacket 118, the mounting bracket 120 may be operatively connected to whichever jacket 116, 118 is the outermost jacket 116, 118. In addition, as illustrated in FIGS. 3 and 4, the mounting bracket 120 may be connected to the sliding bracket 128, which in turn, is connected to the lower jacket 116.

As best shown in FIG. 4, the mounting bracket 120 includes a pair of plate portions 146 connected via a bridge portion 148. The pair of plate portions 146 may be flat and extend along the longitudinal axis X and the bridge portion 148 may extend upwardly and transverse from the longitudinal axis X for locating additional parts between the pair of plate portions 146 on the same or substantially same plane. Each of the plate portions 146 includes an angled tail 150 towards the first end 104 for facilitating connection to the vehicle and accommodating the rake movement of the steering column 102 and adjacent components. The bridge portion 148 is located at least partially on the angled tails 150 and extends to a pair of flange portions 152 that extend upwardly and transverse to the longitudinal axis X along an inner edge of the plate portions 146. The flange portions 152 include a first set of pivot apertures 154 near areas of the flange portions closer to the second end 106. A corresponding groove 156 is defined by plate portions 152 to accommodate insertion of a pivot pin 158.

With continued reference to FIG. 4, the rake bracket assembly 112 further includes a rake bracket 160 that is connected between the mounting bracket 120 and the steering column 102 and pivotally connects to at least one of the steering column 102 and the mounting bracket 120 to facilitate rake movement of the steering column 102. The rake bracket 160 may include a pair of rake flange portions 162 that correspond in shape and orientation to the flange portions 152 of the mounting bracket 120. More particularly, the rake flange portions 162 define a space therebetween and further include corresponding pivot apertures 164 for receiving the pivot pin 158. The rake flange portions 162 may extend further towards the second end 106 than the flange portions 152 of the mounting bracket 120. An area of at least one of the rake flange portions 162 may include a recess 166 for accommodating various additional components that will be described in further detail below. The rake bracket 160 may further connect to or be integral with the sliding bracket 128, which, in turn, connects to the steering column 102, such as the outermost jacket 116, 118. An electrical housing 170 may be connected to a portion of the rake bracket 160, such as the rake flange portions 162, that extend further towards the second end 106 than the corresponding portions of the mounting bracket 120. Details of the electrical housing 170 will be provided below. A rake adjustment actuator 172 may be operably connected to the steering column 102. For example, the rake adjustment actuator 172 may include a motor 174 and a motor driven gear mechanism 176 similar to the longitudinal actuator 122, or may alternatively be a piston-type mechanism. The rake adjustment actuator 172 may be located in the recess 166.

FIG. 5 is an isometric view of the steering column assembly 100 wherein the steering column is tilted via the rake bracket assembly 112. The mounting bracket 120 is attached to a component 178 of the vehicle, such as part of the frame.

Figure 6:
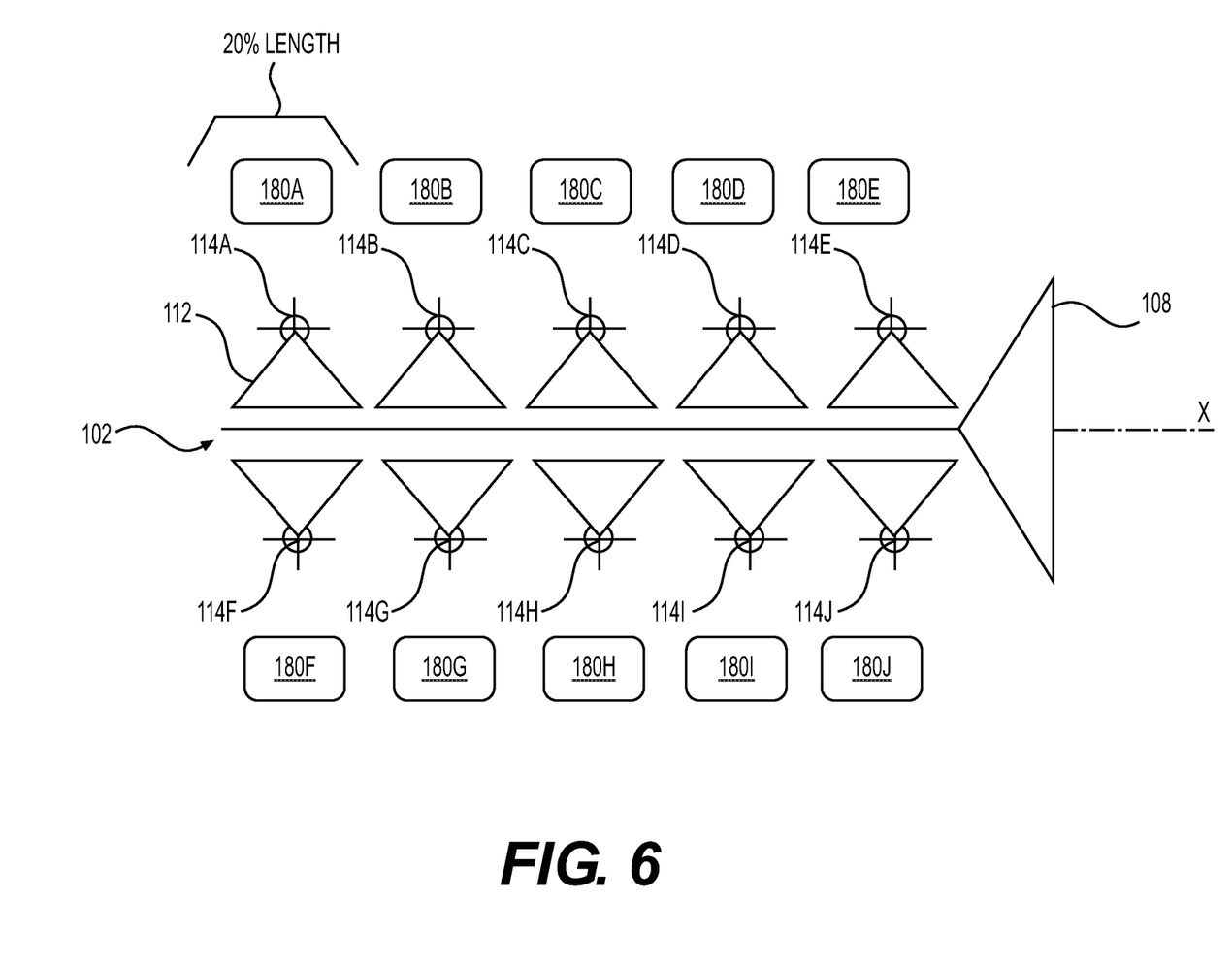
FIG. 6 is an additional schematic drawing depicting alternative locations of the rake bracket assembly and an associated pivot axis.

FIG. 6 is an additional schematic drawing depicting alternative locations of the rake bracket assembly 112 and an associated pivot axis 114A-114J. Each pivot axis 114A-114J may be located serially within an area defining 20% of the length of the steering column 102 (either at maximum extension or compression via axial movement) along the longitudinal axis X. It should be appreciated that the location of the rake bracket assembly 112 and corresponding pivot axis 114A-114J may be vertically above or below the steering column 102 to effectuate vertical or horizontal tilt. Likewise, the rake bracket assembly 112 and corresponding pivot axis 114A-114J may further be located horizontally along a side of the steering column 102 to effectuate vertical or horizontal tilt. In some instances, it may be preferable to include a rake bracket assembly 112 and corresponding pivot axis 114A-114J positioning based on packaging factors, for example one or more vehicular components 180A-180J may be need to be located along a certain distance of the longitudinal axis X. As such, by placing the rake bracket assembly 112 and corresponding pivot axis 114A-114J adjacent to the location of the vehicular component 180A-180J, the travel of the steering column 102 will be limited in that location. For example, a the pivot axis 114C may be beneficial for packaging vehicular component 180C and/or 180H, i.e., those in alignment along longitudinal axis X. Similarly, the pivot axis 114C may be in an acceptable location for placement of components with the 20% length segments on either side, i.e., 180B, 180G, 180D, 180I. The vehicular components 180A-180J may include driveline components, steering components, instrument panel components, engine components, transfer box components, air bag components, and other mechanical and/or electrical vehicular components.

Actuation of the rake adjustment actuator 172 and/or the longitudinal actuator 122 may be manual with one or more release levers (not shown) or may be electronic via one or more controllers 182. For example, the controller 182 may be located in electrical housing 170 and may initiate either longitudinal movement or tilt movement to place the steering column 100 in a stowed or intermediary position as a result of the selection of autonomous driving. The controller 182 and other components of the subject disclosure may work in conjunction with one or more additional electronic components, mechanical components, or method steps such as those described U.S. Pat. No. 9,550,514, titled "RETRACTABLE STEERING COLUMN SYSTEM WITH AIR BAG, VEHICLE HAVING THE SAME, AND METHOD"; U.S. Pat. No. 9,828,016, titled "RETRACTABLE STEERING COLUMN SYSTEM, VEHICLE HAVING THE SAME, AND METHOD"; U.S. Pat. No. 9,809,155, titled "RETRACTABLE STEERING COLUMN ASSEMBLY HAVING LEVER, VEHICLE HAVING RETRACTABLE STEERING COLUMN ASSEMBLY, AND METHOD"; U.S. Pat. No. 9,840,271, titled "RETRACTABLE STEERING COLUMN WITH RAKE LIMITER"; and U.S. Pat. No. 10,577,009B2, titled "RETRACTABLE STEERING COLUMN ASSEMBLY AND METHOD" features and aspects of which are each incorporated in their entirety herein.

It should be appreciated that examples of a steer-by-wire steering column can be equipped without a conventional I-shaft. Without an I-shaft, the rake pivot axis is not required to be close to the area of the lower cardan joint. Instead, the rake pivot axis can be located away from or spaced apart from the area of the lower cardan joint. In one version, the rake pivot axis can be grossly located away from or spaced apart from the area of the lower cardan joint.

These embodiments can utilize the available space in an environment in a more efficient way. For example, in steer-by-wire applications, this design can be improve performance. Although applications having a large hand wheel actuator requiring additional space can restrict the effective use of the space for stow or storage of the steering column assembly (and hand wheel actuator), the embodiments disclosed herein can overcome such limitations.

Any feature, element, component or advantage of any one embodiment can be used on any of the other embodiments.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
    a steering column configured for a steer-by-wire application, the steering column extending between a first end and a second end and having a hand wheel location on the first end and a rotation output on the second end;
    a rake bracket assembly spaced apart from the rotation output and towards the hand wheel location, wherein the rake bracket assembly defines a pivot axis from which the steering column can tilt, wherein the first end and the second end of the steering column both pivot as the steering column is adjusted about the pivot axis; and
    a mounting bracket operatively coupling the steering column to a vehicle structure, the mounting bracket operatively coupled to the rake bracket assembly and having a pair of plate portions, each of the plate portions including an angled tail to accommodate rake movement of the steering column.

2. The steering column assembly of claim 1, wherein the steering column extends along a length between the first end and the second end and the rake bracket assembly is spaced from the rotation output by at least 20% of the length.

3. The steering column assembly of claim 2, wherein the rake bracket assembly is located on a central portion of the steering column, the central portion comprising 20% of the length.

4. The steering column assembly of claim 1, wherein the first end and the second end of the steering column both pivot substantially equal distances as the steering column is tilted about the pivot axis.

5. The steering column assembly of claim 1, wherein the steering column extends along a length between the first end and the second end and the pivot axis is spaced from the hand wheel location by no less than 60% of the length.

6. The steering column assembly of claim 5, wherein the pivot axis is spaced from the hand wheel location by no less than 40% of the length.

7. The steering column assembly of claim 6, wherein the pivot axis is spaced from the hand wheel location by no less than 20% of the length.

8. The steering column assembly of claim 5, further including a vehicular component adjacently above or adjacently below the rake bracket assembly.

9. The steering column assembly of claim 8, wherein the vehicular component includes at least one of instrument electronics, airbag components, or driveline components.

10. The steering column assembly of claim 1, wherein the rotation output includes a lower cardan joint.

11. The steering column assembly of claim 1, wherein the steering column assembly does not comprise an I-shaft.

12. A steering column assembly, comprising:
a steering column configured for a steer-by-wire application, the steering column extending between a first end and a second end and having a hand wheel location on the first end and a rotation output on the second end;
a rake bracket assembly spaced apart from the rotation output and towards the hand wheel location, wherein the rake bracket assembly defines a pivot axis from which the steering column can tilt, wherein the first end and the second end of the steering column both pivot as the steering column is adjusted about the pivot axis; and
a rake adjustment actuator including a motor for tilting and retaining the steering column about the pivot axis,
wherein the rake bracket assembly includes a mounting bracket for static connection to a part of the vehicle and a rake bracket pivotally connected to the mounting bracket and statically connected to the steering column, the mounting bracket having a pair of plate portions, each of the plate portions including an angled tail to accommodate rake movement of the steering column.

13. The steering column assembly of claim 12, wherein the rake adjustment actuator is connected between the mounting bracket and the rake bracket.

14. The steering column assembly of claim 13, wherein the steering column extends along a length between the first end and the second end and the pivot axis is spaced from the hand wheel location by no less than 60% of the length.

15. The steering column assembly of claim 12, wherein the rotation output includes a lower cardan joint.

* * * * *